US012561760B2

(12) United States Patent
Wu et al.

(10) Patent No.: US 12,561,760 B2
(45) Date of Patent: Feb. 24, 2026

(54) MULTI-FRAME IMAGE FUSION METHOD AND SYSTEM, ELECTRONIC DEVICE, AND STORAGE MEDIUM

(71) Applicant: Black Sesame Technologies Co., Ltd., Wuhan (CN)

(72) Inventors: Fanglong Wu, Wuhan (CN); Shanlan Shen, Singapore (SG); Yubo Duan, Singapore (SG)

(73) Assignee: Black Sesame Technologies Co., Ltd., Wuhan (CN)

( * ) Notice: Subject to any disclaimer, the term of this patent is extended or adjusted under 35 U.S.C. 154(b) by 198 days.

(21) Appl. No.: 18/370,237

(22) Filed: Sep. 19, 2023

(65) Prior Publication Data

US 2024/0127403 A1     Apr. 18, 2024

(30) Foreign Application Priority Data

Sep. 19, 2022     (CN) .......................... 202211139390.1

(51) Int. Cl.
| | |
|---|---|
| *G06T 5/50* | (2006.01) |
| *G06T 7/20* | (2017.01) |
| *G06T 9/00* | (2006.01) |
| *G06V 10/24* | (2022.01) |
| *G06V 10/44* | (2022.01) |
| *G06V 10/60* | (2022.01) |

(52) U.S. Cl.
CPC ................. *G06T 5/50* (2013.01); *G06T 7/20* (2013.01); *G06T 9/00* (2013.01); *G06V 10/245* (2022.01); *G06V 10/44* (2022.01); *G06V*

*10/60* (2022.01); *G06T 2207/10144* (2013.01); *G06T 2207/20221* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 2009/0274365 A1* | 11/2009 | Tsuda | ................... | G06T 3/4007 |
| | | | | 382/166 |
| 2017/0359498 A1* | 12/2017 | Benchemsi | ............... | G06T 5/92 |
| 2022/0101503 A1* | 3/2022 | Ivanov | ........................ | G06T 5/40 |
| 2023/0171509 A1* | 6/2023 | Varghese | .................. | G06T 5/50 |
| | | | | 348/222.1 |

\* cited by examiner

*Primary Examiner* — Matthew Yeung
(74) *Attorney, Agent, or Firm* — Timothy T. Wang; Panorama IP Group, PLLC

(57) ABSTRACT

A multi-frame image fusion method and system, an electronic device, and a storage medium are provided including performing image alignment based on a frame with highest exposure sharpness among a plurality of frames of images, wherein the image alignment includes extracting feature points of each of the plurality of frames to make the plurality of frames have a common spatial layout; calculating a fusion region of each frame based on local light source diffusion weight information in a spatial domain; performing image fusion on the plurality of frames with different exposures based on the fusion region, wherein the image fusion includes fusing the plurality of frames with different exposures into a fused image; and compressing the fused image to a preset dynamic range section. During the image fusion process, the local information is introduced into images to make the fused image possess a higher dynamic range and a lower halo.

9 Claims, 7 Drawing Sheets

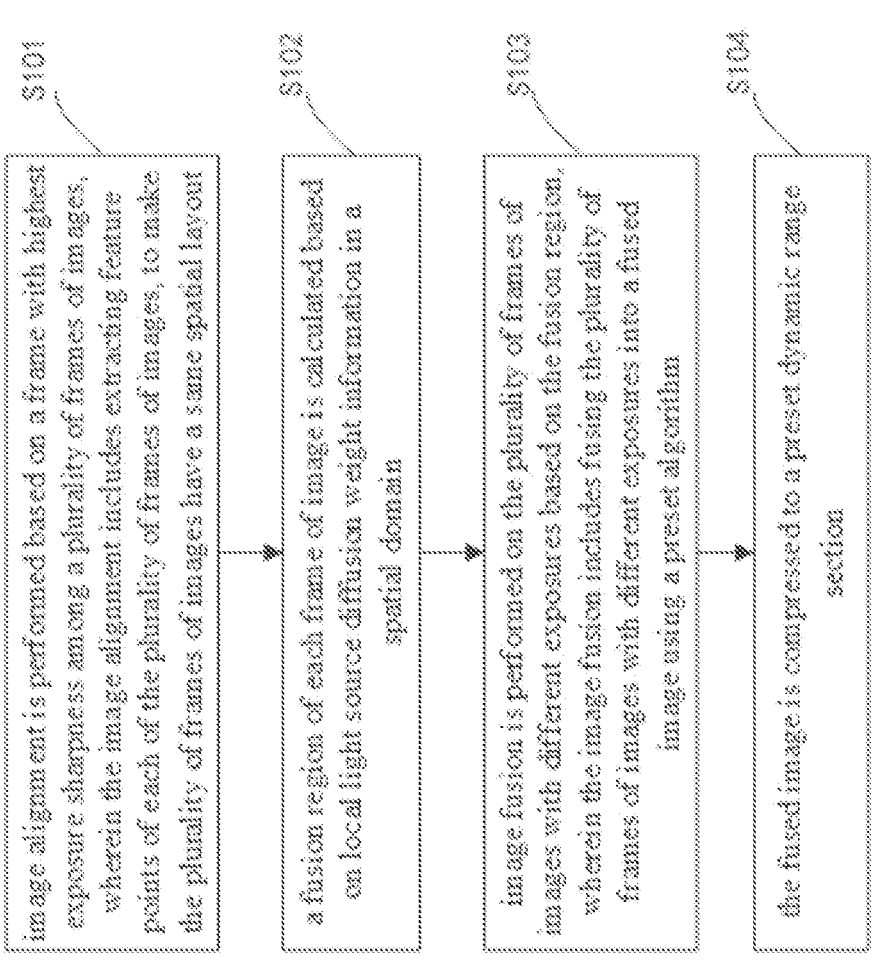

S101 image alignment is performed based on a frame with highest exposure sharpness among a plurality of frames of images, wherein the image alignment includes extracting feature points of each of the plurality of frames of images, to make the plurality of frames of images have a same spatial layout

S102 a fusion region of each frame of image is calculated based on local light source diffusion weight information in a spatial domain

S103 image fusion is performed on the plurality of frames of images with different exposures based on the fusion region, wherein the image fusion includes fusing the plurality of frames of images with different exposures into a fused image using a preset algorithm

S104 the fused image is compressed to a preset dynamic range section

FIG. 1 multi-frame image fusion system 210 acquiring circuitry 220 calculating circuitry 230 fusing circuitry 240 mapping circuitry

MULTI-FRAME IMAGE FUSION METHOD AND SYSTEM, ELECTRONIC DEVICE, AND STORAGE MEDIUM

RELATED APPLICATION

This application claims the benefit under 35 U.S.C. § 119(a) of the filing date of Chinese Patent Application No. 202211139390.1, filed in the Chinese Patent Office on Sep. 19, 2022. The disclosure of the foregoing application is herein incorporated by reference in its entirety.

FIELD OF THE INVENTION

Embodiments of the present disclosure relate to computer graphics, and more particularly, to a multi-frame image fusion method and system, an electronic device, and a storage medium.

BACKGROUND OF THE INVENTION

When capturing images, if a dynamic range in the environment is too large, such as complex light sources or backlit scenes, a full dynamic range of images cannot always be captured, especially at a nighttime scene, due to accuracy of a sensor module in a mobile phone, etc. Therefore, in an image generation process, to ensure that quality of generated images is maintained within an acceptable range, a dynamic range of the images is always kept at a low dynamic range, so that most of scene information can be captured, while part of high-light or low-light information in the images is discarded, resulting in a difference between human vision and images. To ensure that image acquisition at night can always provide a good visual effect, fusion of multiple images with different exposures has become a primary choice.

However, the fusion of multi-frame exposure images may face great challenges, such as moving scenes, halo or contrast compression. During image fusion, a halo that may be generated may further enlarge a highlight region, and a pre-existing halo around a light source cannot be effectively eliminated.

SUMMARY OF THE INVENTION

Embodiments of the present disclosure provide a multi-frame image fusion method and system, an electronic device, and a storage medium. During an image fusion process, local information is introduced into images by using a method of light source diffusion weight, to make a fused image possess a higher dynamic range and a lower halo.

In an embodiment of the present disclosure, a multi-frame image fusion method is provided, including: performing image alignment based on a frame with highest exposure sharpness among a plurality of frames of images, wherein the image alignment includes extracting feature points of each of the plurality of frames of images, to make the plurality of frames of images have a common spatial layout; calculating a fusion region of each frame of image based on local light source diffusion weight information in a spatial domain; performing image fusion on the plurality of frames of images with different exposures based on the fusion region, wherein the image fusion includes fusing the plurality of frames of images with different exposures into a fused image using a preset algorithm; and compressing the fused image to a preset dynamic range section.

In an embodiment of the present disclosure, a multi-frame image fusion system is provided, including: an acquiring circuitry configured to perform image alignment based on a frame with highest exposure sharpness among a plurality of frames of images, wherein the image alignment includes extracting feature points of each of the plurality of frames of images, to make the plurality of frames of images have a common spatial layout; a calculating circuitry configured to calculate a fusion region of each frame of image based on local light source diffusion weight information in a spatial domain; a fusing circuitry configured to perform image fusion on the plurality of frames of images with different exposures based on the fusion region, wherein the image fusion includes fusing the plurality of frames of images with different exposures into a fused image using a preset algorithm; and a mapping circuitry configured to compress the fused image to a preset dynamic range section.

In an embodiment of the present disclosure, an electronic device is provided, including a memory, a processor, and a computer program stored in the memory and operable on the processor, wherein when the processor executes the program, the above method is performed.

In an embodiment of the present disclosure, a non-transitory computer-readable storage medium having computer instructions stored therein is provided, wherein the computer instructions are configured to cause a computer to execute the above method.

In the embodiments of the present disclosure, during the image fusion process, the local information is introduced into images by using the method of light source diffusion weight, to make the fused image possess a higher dynamic range and a lower halo.

Other objectives and aspects of the invention will become apparent from the following detailed description, taken in conjunction with the accompanying drawings, which illustrate, by way for example, the features in accordance with embodiments of the invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although, the invention is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles. Furthermore, the drawings may contain text or captions that may explain certain embodiments of the present invention. This text is included for illustrative, non-limiting, explanatory purposes of certain embodiments detailed in the present invention. In the drawings:

Embodiments of the invention are described with reference to the following figures. The same numbers are used throughout the figures to reference similar features and components. The features depicted in the figures are not necessarily shown to scale. Certain features of the embodiments may be shown exaggerated in scale or in somewhat schematic form, and some details of elements may not be shown in the interest of clarity and conciseness.

FIG. 1 is a flow chart of a multi-frame image fusion method according to an embodiment of the present disclosure;

Figure 2:
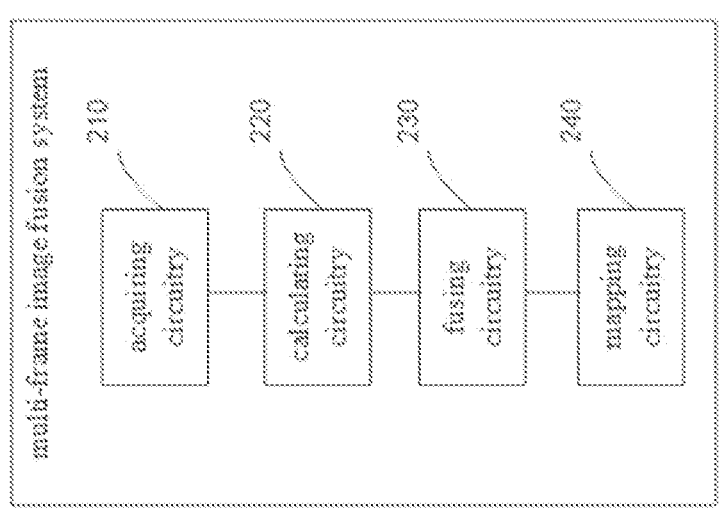
FIG. 2 is a schematic diagram of a multi-frame image fusion system according to an embodiment of the present disclosure.

DETAILED DESCRIPTION OF THE
INVENTION

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For clarity, details relating to technical material that is known in the technical fields related to the invention have not been described in detail so as not to unnecessarily obscure the present invention.

In the description and claims of the application, each of the words "units" represents the dimension in any units such as centimeters, meters, inches, foots, millimeters, micrometer and the like and forms thereof, are not necessarily limited to members in a list with which the words may be associated.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items from the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present invention contains headers. It should be understood that these headers are used as references and are not to be construed as limiting upon the subjected matter disclosed under the header.

This specification comprises references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

The presence of broadening words and phrases such as "one or more," "at least," "but not limited to" or other like phrases in some instances shall not be read to mean that the narrower case is intended or required in instances where such broadening phrases may be absent.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred systems and methods are now described.

When capturing images, if a dynamic range in the environment is too large, such as complex light sources or backlit scenes, a full dynamic range of images cannot always be captured, especially at a nighttime scene, due to accuracy of a sensor module in a mobile phone, etc. Therefore, in an image generation process, to ensure that quality of generated images is maintained within an acceptable range, a dynamic range of the images is always kept at a low dynamic range, so that most of scene information can be captured, while part of high-light or low-light information in the images is discarded, resulting in a difference between human vision and images. To ensure that image acquisition at night can always provide a good visual effect, fusion of multiple images with different exposures has become a primary choice.

However, the fusion of multi-frame exposure images may face great challenges, such as moving scenes, halo or contrast compression. During image fusion, a halo that may be generated may further enlarge a highlight region, and a pre-existing halo around a light source cannot be effectively eliminated.

Therefore, embodiments of the present disclosure provide a multi-frame image fusion method and system, an electronic device, and a storage medium.

An embodiment of the present disclosure provides a multi-frame image fusion method, including S101 to S104.

In S101, image alignment is performed based on a frame with highest exposure sharpness among a plurality of frames of images, wherein the image alignment includes extracting feature points of each of the plurality of frames of images, to make the plurality of frames of images have a common spatial layout.

In some embodiments, after all input images are exposed, sharpness detection is performed on all the images with different exposures. Sharpness is a most essential factor affecting image quality, and determines capability of an image system to reproduce image details. Sharpness is determined by boundaries of regions of different chroma or colors. After sharpness detection, a frame of image with highest exposure sharpness is determined, and image alignment is performed based on this frame of image. That is, feature points of each frame of image are extracted, feature point sets of the plurality of frames of images are matched to obtain optimal matching, and optimizing corresponding relationship between each frame of image using affine transformation/perspective transformation, so as to obtain transformation parameters. Optimum parameters are utilized to make the plurality of frames of images have a common spatial layout, to ensure spatial consistency, which prevents ghosting during the fusion due to external reasons such as camera shake, thereby ensuring image quality and providing a basis for image fusion. Methods for sharpness detection include 10-90% rise distance technique, relative contrast (output contrast/input contrast), frequency domain method and hypotenuse method. In the embodiments, methods for the sharpness detection method are not limited, and can be selected according to practical requirements.

In some embodiments, after the image alignment is performed based on the frame with the highest exposure sharpness among the plurality of frames of images, the method further includes: detecting a moving object among the plurality of frames of images with different exposures after the image alignment; mapping the plurality of frames of images with different exposures to a same brightness section; and calculating differences between different frames of images, to find an interference region in each of the plurality of frames of images.

Specifically, after image alignment is performed on the input images, it is necessary to detect the moving object among the plurality of frames of images with different exposures. When using a background difference method to detect the moving object, the interference region generally appears in the exposed images, which is also called a ghost region. In most high dynamic range imaging techniques, a target scene for capturing needs to be kept still. Once the scene changes during capturing, or a moving object breaks in, blurred or translucent shadow may appear in a moving region in a final fused image, which is generally called "ghosting". When initially modeling a background, the moving object may be in the background, and ghost images may be generated after movement. In another case, when the moving object in the scene changes from motion to static, and then starts to move, ghost images may also be generated. Other things like ghosting are objects left behind in the background, or a moving object that has stopped moving. Considering difference in exposure of different images, the brightness of the input images is guaranteed by dynamic frame selection. A histogram mapping method may be used to map images with different exposures to a same brightness section, and then a difference between different frames of images is calculated to find the ghost region in each frame of the exposed image. When the object in the scene moves, there is an obvious difference between the frames. The two frames are subtracted to obtain an absolute value of a brightness difference between the two frames, and whether the brightness difference is greater than a threshold is determined to analyze motion characteristics of a video or an image sequence, so as to determine whether there is object movement in the image sequence, thereby finding the ghost region.

In S102, a fusion region of each frame of image is calculated based on local light source diffusion weight information in a spatial domain.

In some embodiments, S102 includes calculating a fusion weight of each frame of image based on brightness and assigning the fusion weight of the frame of image with a higher exposure in a light source region to the frame of image with a lower exposure.

Figure 3:
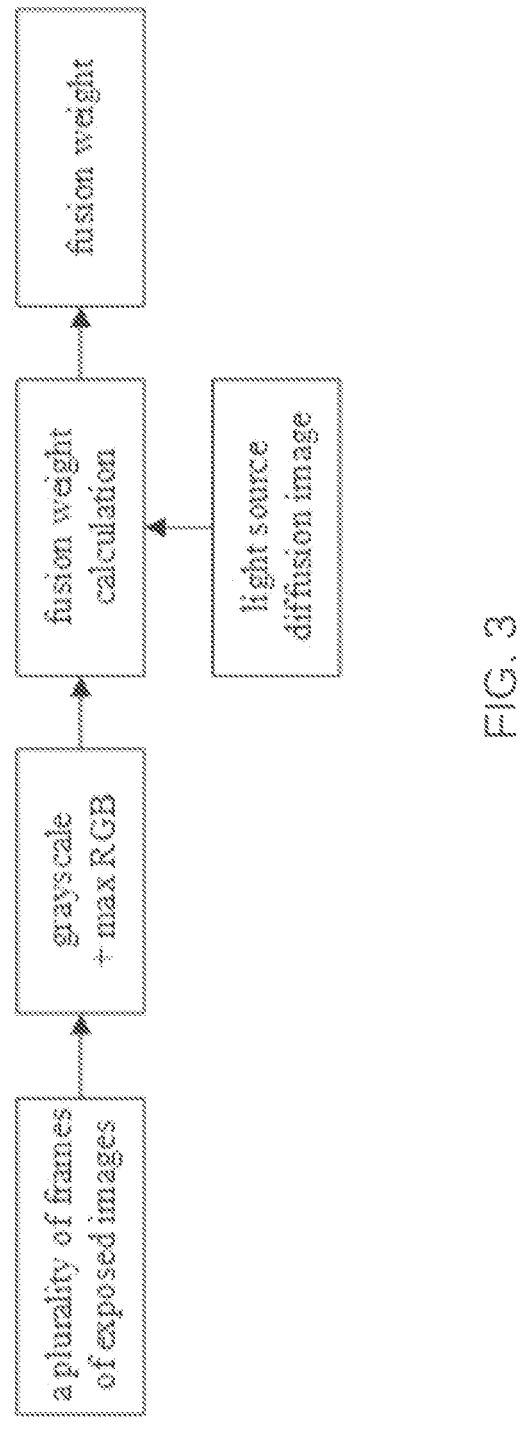
FIG. 3 is a schematic diagram of fusion weight calculation for image according to an embodiment of the present disclosure.

In some embodiments, as shown in FIG. 3, according to the plurality of frames of exposed images, a maximum RGB and grayscale of the plurality of frames of exposed images may be used as a joint input brightness level, and then the joint input brightness level is used as a benchmark to divide available sections with different exposures. The fusion weight of each frame of exposed image is calculated, and local brightness diffusion weight information of a spatial domain is introduced into the calculation of global weight, which may effectively suppress appearance of halos. The plurality of frames of exposed images includes three or more images with different exposures of a same scene. The exposed images are subjected to some image processing operations in an image transformation domain or a spatial domain and fused into an image with high definition and plenty of color details.

In the fusion of the plurality of frames of exposed images, only considering the global information to process the images may make it difficult to balance a contrast of the images, and it is prone to introduce halos or cause other situations. Therefore, it is necessary to introduce local information in the processing process to protect or specialize difficult-to-process regions such as a highlight region. The light source diffusion weight can perform special processing on a light source region during post-processing such as weight calculation or mapping, so as to reduce halos and improve a global contrast of the image.

Figure 4:
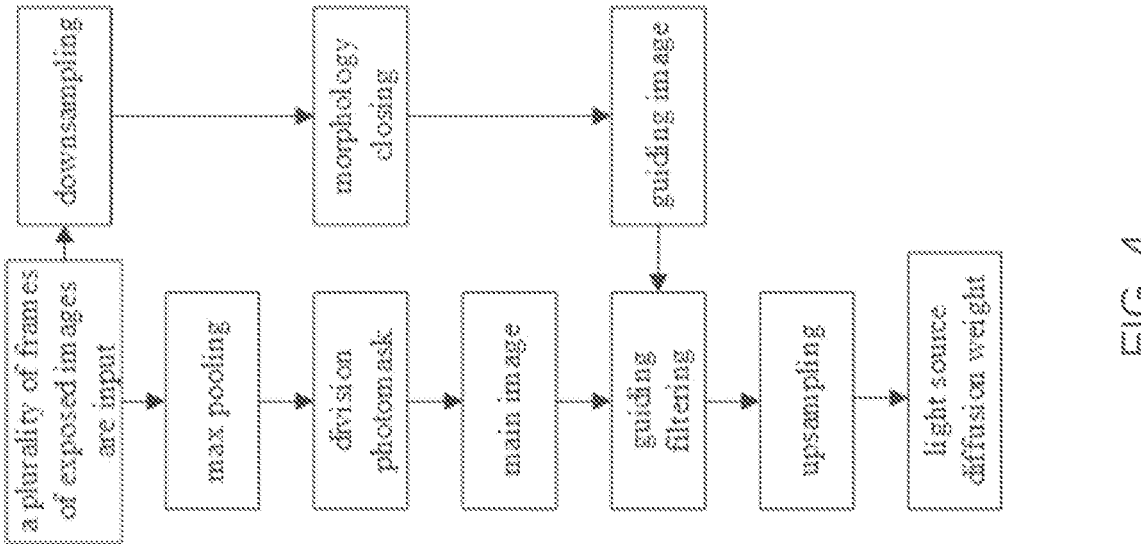
FIG. 4 is a schematic diagram of light source diffusion weight calculation for image according to an embodiment of the present disclosure.

The light source diffusion weight may be calculated by simulating a light source diffusion model based on guided filtering. As shown in FIG. 4, after the plurality of frames of exposed images are input, it is necessary to locate a position of a light source. A biggest difference between the light source and a reflective object lies in that the light source is a self-illuminating object, which is bright and not easily affected by ambient brightness. Therefore, short-exposure capturing also possibly make a sensor get a higher response. Accordingly, in a process of detecting the light source, max pooling and division photomask are used to obtain a main image, that is, intercepting a brightest part that reaches a threshold in a shortest exposure image as the light source, where the threshold is adjusted according to a specific exposure ratio. Due to the limitation of environment for capturing images, the same light source has different halo diffusion characteristics in different atmospheric environments. Accordingly, longer exposure can characterize light source divergence capability in a current scene to some extent. In addition, during the image fusion, a highlight section that introduces too many light source portions in a low-frequency part may also enlarge halos. Therefore, an image that is close to morphology of the input image and has a longer exposure as a guide image, and brightness information of the guide image is used to guide a direction and strength of the light source to diffuse outward. In the diffusion, a direction that is closer to the light source in the spatial domain and closer to the brightness level of the light source in brightness may obtain greater diffusion strength. A light diffusion map can be obtained through multiple iterations. Due to smooth nature of diffusion of the light source, these calculations can be done on small downsampled images, thereby reducing computation time. Generally, sampling refers to downsampling, which is the extraction of signals. Upsampling and downsampling are both re-sampling of digital signals. A re-sampling rate is compared with a sampling rate with which a digital signal (such as sampling from an analog signal) is obtained originally. If the former is greater than the latter, the re-sampling is called upsampling; otherwise, the former is called downsampling. The upsampling is a reverse process of the downsampling. A method for calculating the light source diffusion weight is not limited to methods used above, and can be selected according to practical requirements.

To provide better visual presentation for different regions of the entire image without being affected by factors such as light sources in the scene, it is necessary to select a most suitable region for fusion from the images with different exposures. Brightness information, color information and local information of the spatial domain are comprehensively used for adjustment to select the most suitable exposed image for a local region. In weight calculation, a most suitable multi-exposure fusion region is selected mainly based on the brightness information and related color information of the images. In pixel-level weight calculation, as the input images are relatively close to an exposure difference, there may be more than one frame of image in an appropriate brightness range. In this condition, color information is introduced into weight allocation as a reference, giving more support for exposures with more vivid colors. In addition, using a single grayscale image as a standard for weight calculation may affect fairness of weight allocation of an object with a single color due to a way of generating a grayscale image. In view of this, as shown in FIG. 3, the brightness information involved in the calculation is instead composed of a grayscale image in cooperation with a bright channel image, where the bright channel image is generated by an RGB maximum flux of pixels in an RGB color space. A calculation rule for grayscale image makes prior color brightness information always lower than real scene brightness to different extent, while adding color information can keep a color of the fused image always bright and highly consistent with a natural image, preventing low saturation of the color of the fused image that may be caused by the weight allocation. Further, in the weight calculation, the local brightness diffusion information in the spatial domain is introduced, where the light source diffusion image is mainly used to make a weight allocation threshold of the local region of the light source lower. A specific execution method is expressed by formulas, which is transformed from formula (1) to formula (2) as follows:

$$W=(Y-Y_{low})/(Y_{high}-Y_{low}), Y_{high}>Y>Y_{low} \tag{1}$$

$$W=(Y-Y_{p\_low})/(Y_{p\_high}-Y_{p\_low}), Y_{p\_high}>Y>Y_{p\_low} \tag{2}$$

$$Y_{p\_low}=Y_{low}-a, Y_{p\_high}=Y_{high}-a \tag{3},$$

where in the formula (1), W is an image fusion weight, Y is brightness of the image, is high brightness of the image, and $Y_{low}$ is low brightness of the image; in the formulas (2) and (3), W is an image fusion weight calculated based on cooperative constitution of a grayscale image and a bright channel image, Y is brightness of the image obtained based on cooperative constitution of the grayscale image and the bright channel image, is low brightness of the image obtained based on cooperative constitution of the grayscale image and the bright channel image, is high brightness of the image obtained based on cooperative constitution of the grayscale image and the bright channel image, a represents a pixel-level light source diffusion weight. In conventional weight calculation, all weights are assigned to a current frame when brightness is lower than, and no weight is assigned to the current frame when the brightness is higher than, where and are constants globally.

In S103, image fusion is performed on the plurality of frames of images with different exposures based on the fusion region, wherein the image fusion includes fusing the plurality of frames of images with different exposures into a fused image using a preset algorithm.

In some embodiments, S103 specifically includes performing image fusion on the plurality of frames of images with different exposures using a method based on Laplacian pyramid fusion.

In some embodiments, said performing image fusion on the plurality of frames of images with different exposures using a method based on Laplacian pyramid fusion mainly includes following steps. A mask of fusion regions of the images with different exposures is calculated based on components such as brightness or details. Afterward, the Laplacian operator is used to separate high frequencies of the plurality of frames of the exposed images at different scales. Image fusion is then performed to obtain a fusion image with a natural transition of each block. Smooth transition of optimally selected regions of the images with different exposures is realized based on the Laplacian pyramid. The mask is to block the processed images (all or part) with a selected image, figure or object to control a region or a process of image processing.

On the basis of Laplacian pyramid fusion, calculation of "light source diffusion weight" associated with local spatial domain information is added, so that the local light source information in the spatial domain is used to exert influence on fusion and post-processing, which makes the images to possess smaller halos and higher contrast in the processing process. The light source diffusion weight has been described in the above embodiments and is not repeated here.

Synthesizing an image with a high dynamic range through a plurality of images of the same scene with different exposures is a mainstream method for restoring the dynamic range for images. It is not limited to the method based on Laplacian pyramid fusion, other multi-exposure fusion algorithms can also be used, such as high dynamic range image synthesis based on physical exposure ratio, block-based structural decomposition algorithm, or multi-exposure fusion algorithm based on Poisson fusion. In the high dynamic range image synthesis based on exposure ratio, overexposed pixels in the images with different exposures are filled with appropriate values according to an original exposure ratio, and then the images are mapped within a predetermined range. In the block-based structural decomposition algorithm, structural information of the images is decomposed into different modules, such as color, signal strength or signal structure, then the different modules are confused respectively, and finally the confused modules are merged into a color image. In the multi-exposure fusion algorithm based on Poisson fusion, based on smooth transition and edge preservation of a highlight region, information of the same region with low exposure is pasted back.

In some embodiments, following performing image fusion on the plurality of frames of images with different exposures based on the fusion region, the method further includes: detecting whether there is a portrait and/or a region where the portrait is located, and protecting the portrait to keep brightness of the portrait within an appropriate range if there is the portrait and/or the region where the portrait is located.

Figure 5:
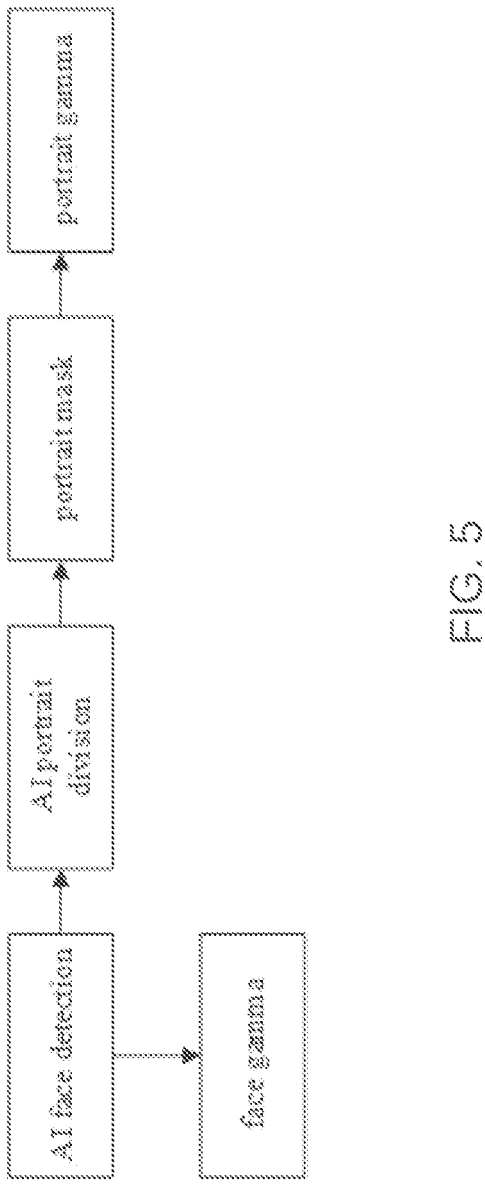
FIG. 5 is a schematic diagram of human image detection according to an embodiment of the present disclosure.

In some embodiments, when the brightness of the portrait is at a low position in the entire dynamic range of the scene (which always happens in nighttime scenes with lights), using Laplacian multi-exposure fusion often results in a phenomenon that the portrait is relatively dark, and image perception is extremely poor. Therefore, when there is a portrait scene, it is necessary to protect the portrait and keep the brightness of the portrait within an appropriate range. Therefore, as shown in FIG. 5, it is first necessary to detect whether there is a portrait and a region where it is located. If more refined processing is required, the portrait part needs to be segmented separately. Therefore, a PFLD face detection model using mobileNet v2 as a backbone structure can quickly detect the region where the portrait is located, and a U-Net segmentation network can accurately segment the region where the portrait is located. The PFLD face detection model can automatically locate a set of predefined face reference points (such as eye corners and mouth corners), which has high monitoring accuracy and processing speed. The U-Net segmentation network is an image segmentation network based on CNN, which is mainly used for medical image segmentation. The U-Net segmentation network was originally proposed to be used for cell wall segmentation, and then it has excellent performance in lung nodule detection and blood vessel extraction on fundus retina. Therefore, the U-Net segmentation network can be used to accurately segment the region where the portrait is located.

In some embodiments, said detecting whether there is a portrait and/or a region where the portrait is located, and protecting the portrait to keep brightness of the portrait within an appropriate range if there is the portrait and/or the region where the portrait is located includes: detecting the portrait and/or the region where the portrait is located by using artificial intelligence face detection, and calculating a gamma mapping curve based on a brightness variation of the portrait, to keep the brightness of the portrait within the appropriate range after the image fusion. This may always ensure that the brightness of the face is in the appropriate range after fusion, which keeps the brightness of the face comfortable with a small amount of calculation. Alternatively, AI portrait matting may be used, and gamma mapping fusion is performed with foreground and background blocks, where different mapping curves of the foreground and background are calculated respectively, so that the portrait is always in a comfortable range, while normal mapping of the background is also ensured. This has high accuracy, as the portrait can be processed more finely, and the background can be mapped normally by processing the portrait and the background separately. Therefore, this method can accurately protect details, colors, and brightness of the portrait without affecting the normal mapping of the background. Through the above method, the human face may be effectively protected. The gamma curve is a special tone curve in an section of 0 to 1. When the gamma value is equal to 1, input and output signals are linearly corresponding, the input is equal to the output, and the signal has no "distortion". When the gamma value is greater than 1, the output signal is always smaller than the input signal, and the gamma value greater than 1 may cause less distortion to the input signal, and output brightness is lower than expected. When the gamma value is smaller than 1, the output signal is always greater than the input signal, and the gamma value smaller than 1 may make the output brightness higher. A way of protecting the face is not limited to the above, and other ways of protecting the face may also be used according to practical requirements.

In S104, the fused image is compressed to a preset dynamic range section.

In some embodiments, multiple different curves are used to map out a main part, a highlight part and a dark part. Based on the local spatial information, Y values of two mapped images are fused at a pixel level. By taking a color of a main frame as a benchmark and taking a Laplacian pyramid fusion weight as a mask, color correction is performed to a normal brightness range of the images, to ensure consistency of the color before and after fusion. The fused image with the high dynamic range is compressed to a specified dynamic range, to obtain a high-quality image with a higher dynamic range. YUV is a color encoding method, which is a type of compiling true-color color space, and generally used in various video processing components. YUV takes human perception into account when encoding photos or videos and allows bandwidth reduction for chroma. "Y" represents the brightness, i.e., a gray scale value, and a range value from black to white, thus, an image with only Y value is black and white. "U" represents a color value, and "V" represents saturation of the color. "U" and "V" are used to specify a color of a pixel.

Figure 6:
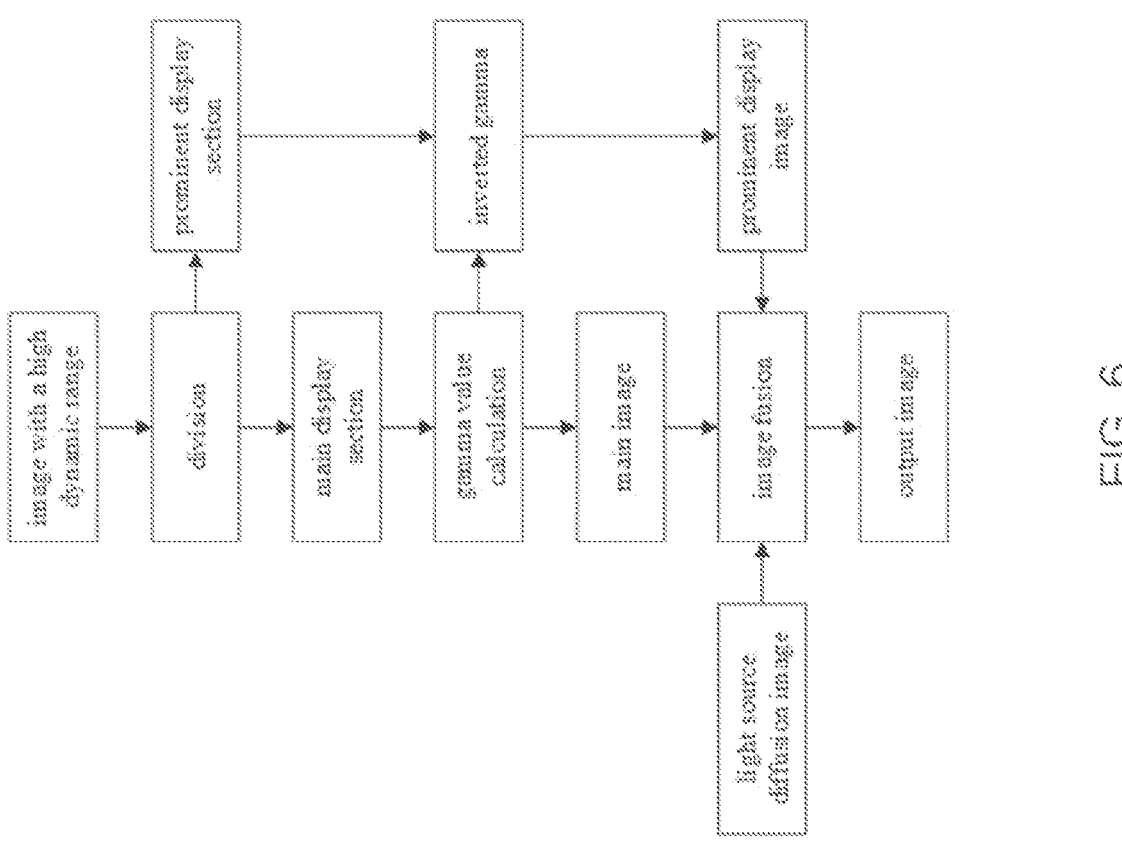
FIG. 6 is a schematic diagram of image fusion according to an embodiment of the present disclosure.

If the image exceeds a vested dynamic range due to fusion, it needs to be compressed to the vested range. Brightness distribution of different regions in the entire image is different, while too much reliance on global information may result in compressing to a fixed and small range due to an overhigh dynamic range, making an overall contrast of the compressed image approach to flattening. Therefore, the local information in the spatial domain is fully considered, to enable a local contrast not to be compressed as much as possible. As shown in FIG. 6, the global dynamic range of the image with the high dynamic range is divided into multiple sections for mapping, such as a main display section and a prominent display section. The prominent display section may include a highlight display section and a dark display section, etc. The main display section may divide information at both ends of a histogram, and use a slash for mapping, mainly to ensure that contrast information of a region with normal brightness is not compressed too much. To ensure that information and contrast of the highlight display section and the dark display section not to be compressed, gamma curves greater than 1 and smaller than 1 may be used for mapping. Human eye's perception of brightness conforms to gamma curves, that is, it is more sensitive to changes in a dark area and slower to changes in a bright area. Some data may be lost when the images are captured and encoded, and impact of data loss on image quality can be reduced by increasing bit width and using an encoding form (i.e., inverted gamma) that conforms to a curve of human eyes.

In a process of mapping, to better process the dynamic range and halos near the light source as well as highlight details, a light source diffusion image may be used, where the light source diffusion image spreads outward from the light source and makes brighter regions easier to diffuse according to brightness information of adjacent pixels in the spatial domain. Accordingly, in the image fusion of multi-curve mapping, the diffusion image is used as one of fusion weight benchmarks. For a light source part, image information of the main display section is used much more. The closer to the light source part, the more information of the highlight display section is used. In this way, the fusion of the main image, the light source diffusion image and the prominent display image is used to obtain an image with a higher dynamic range. The fusion based on the local information in the spatial domain has advantages of preventing the local dynamic range from being compressed, improving image contrast, and suppressing halo during the mapping.

In some embodiments, following compressing the fused image to a preset dynamic range section, the method further includes: applying an image enhancement method to make local brightness of different regions in each of the plurality of frames of images with different exposures close to each other.

Figure 7:
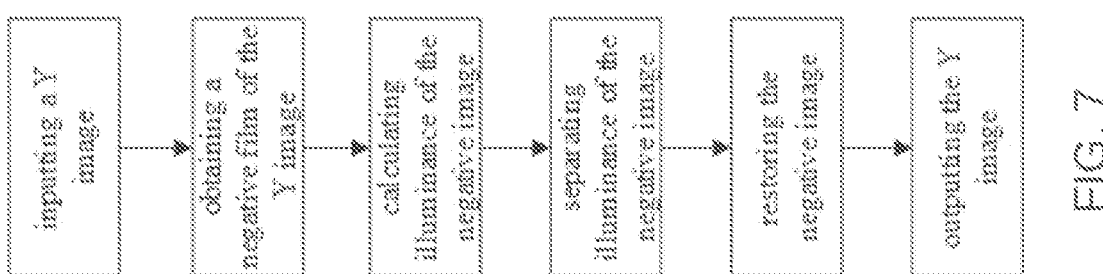
FIG. 7 is a schematic diagram of image enhancement according to an embodiment of the present disclosure.

In some embodiments, to process halo or haze that may exist in the input images in a targeted manner, post-processing halo technology based on an idea of Retinex may be used. Retinex is a commonly used method based on scientific experiments and scientific analysis, with a main function of adjusting the local brightness information of different regions of the image to a close degree. Based on this function, a negative image and Retinex processing mode may be used to reduce brightness of a region including haze to a same level as a normal region as possible, so as to achieve a purpose of suppressing the haze. Specifically, as shown in FIG. 7, first, a negative film of a Y image in a YUV image is obtained, where the negative film is an image obtained after exposure and development processing, its light and dark are opposite to those of a subject captured, and its color is a complementary color of the subject captured. The negative film needs to be printed on a photo to be restored to a positive image. Take a black-and-white film as an example, a person's hair is white on the negative film, and white clothes are black on the negative film. For a colorful negative film, a color on the film is just complementary to an actual color of scene, for example, red clothes are cyan on the film. Second, illuminance of the negative image is estimated, and the illuminance of the negative image is separated based on an illuminance image. The illuminance refers to energy of received visible light per unit area and indicates intensity of light and a degree of illumination on a surface area of an object. Afterward, the negative image after separating the illuminance is restored to a normal Y domain, and then a UV value is proportionally mapped correspondingly, to adjust the local brightness information of different regions of the image to a similar degree.

In the calculation of the Retinex illuminance image, for targeted suppression of the image with halo, a morphological closing operation may be used to smooth the image, which may cover some dark information further. The closing operation is to expand first and then corrode and has a function of filling small holes in objects, connecting adjacent objects and smoothing boundaries. In the negative image, local brightness information of halo regions is relatively flat and dark, which indicates that these regions are hardly affected by the closing operation excessively, while other regions are closer to 1 of the section [0, 1] after morphological calculation. This also allows effectively separating halo regions and non-halo regions. In addition, it is unavoidable that an edge of the closed operation is not always consistent with a natural edge, which produces artificial traces which can be corrected by guiding filtering. The guiding filtering is mainly used for image enhancement, image fusion, image defogging, image denoising, feathering, beautification, and 3D reconstruction, etc., and has high image processing speed and efficiency.

From above, with the multi-frame image fusion method provided in the embodiments of the present disclosure, the images of the same scene with different exposures are fused, and the local information is introduced into images by using the method of light source diffusion weight during the image fusion process, to make the fused image possess a higher dynamic range, a lower halo and higher quality, and be more aesthetic. In addition, the image is post-processed using Retinex technology, which further reduces halo of the input images on the basis of ensuring image contrast. Especially when there is haze in the input images, halo suppression is better realized, and stability is further improved. By using dynamic frame selection, brightness of the input images is ensured. A mask of bright spots with short-exposure and dark spots with long-exposure is used to calculate a division threshold at both ends of the histogram of the fused image to ensure the division of a best dynamic range. A color of the main frame is used as the reference to map to the fused image to ensure consistency of the color of the image, which makes the image possess robust fusion effect in complex scenes. A portrait protection module enables stable output in portrait scenes, and also ensures natural transition of normal regions and light sources in complex light source environments.

An embodiment of the present disclosure further provides a multi-frame image fusion system, including: an acquiring circuitry 210 configured to perform image alignment based on a frame with highest exposure sharpness among a plurality of frames of images, wherein the image alignment includes extracting feature points of each of the plurality of frames of images, to make the plurality of frames of images have a common spatial layout; a calculating circuitry 220 configured to calculate a fusion region of each frame of image based on local light source diffusion weight information in a spatial domain; a fusing circuitry 230 configured to perform image fusion on the plurality of frames of images with different exposures based on the fusion region, wherein the image fusion includes fusing the plurality of frames of images with different exposures into a fused image using a preset algorithm; and a mapping circuitry 240 configured to compress the fused image to a preset dynamic range section.

In some embodiments, the calculating circuitry 220 is further configured to: detect a moving object among the plurality of frames of images with different exposures after the image alignment; map the plurality of frames of images with different exposures to a same brightness section; and calculate differences between different frames of images, to find an interference region in each of the plurality of frames of images.

In some embodiments, the calculating circuitry 220 is further configured to: calculate a fusion weight of each frame of image based on brightness and assign the fusion weight of the frame of image with a higher exposure in a light source region to the frame of image with a lower exposure.

In some embodiments, the fusing circuitry 230 is further configured to perform image fusion on the plurality of frames of images with different exposures using a method based on Laplacian pyramid fusion.

In some embodiments, the mapping circuitry 240 is further configured to apply an image enhancement method to make local brightness of different regions in each of the plurality of frames of images with different exposures close to each other.

In some embodiments, the multi-frame image fusion system further includes a monitoring circuitry configured to: detect whether there is a portrait and/or a region where the portrait is located and protect the portrait to keep brightness of the portrait within an appropriate range if there is the portrait and/or the region where the portrait is located.

In some embodiments, the monitoring circuitry is further configured to: detect the portrait and/or the region where the portrait is located by using artificial intelligence face detection, and calculate a gamma mapping curve based on a brightness variation of the portrait, to keep the brightness of the portrait within the appropriate range after the image fusion.

An embodiment of the present disclosure further provides an electronic device, including a memory, a processor, and a computer program stored in the memory and operable on the processor, wherein when the processor executes the program, the method in any one of the above embodiments is performed.

An embodiment of the present disclosure further provides a non-transitory computer-readable storage medium having computer instructions stored therein, wherein the computer instructions are configured to cause a computer to execute the method in any one of the above embodiments.

It could be understood that the specific examples herein are only intended to help those skilled in the art to better understand the embodiments of the present disclosure, rather than limiting the scope of the present disclosure.

It could be understood that in various embodiments of the disclosure, sequence numbers of processes do not indicate an order of execution, and an execution order of each process should be determined by its functions and internal logic. The sequence numbers should not limit an implementation process of the embodiments of the disclosure.

It could be understood that the various embodiments described in the disclosure can be implemented alone or in combination, which is not limited herein.

Unless otherwise stated, all technical and scientific terms used in the embodiments of the disclosure have the same meaning as commonly understood by those skilled in the art. The terms used in the disclosure are merely for purpose of describing specific embodiments and are not intended to limit the scope of the disclosure. The term "and/or" used in the disclosure includes any and all combinations of one or more of the associated listed items. As used in the embodiments of the disclosure and the appended claims, singular forms "a", "above" and "the" are also intended to include plural forms unless the context clearly dictates other meanings.

It could be understood that the processor in the embodiments of the disclosure may be an integrated circuit chip which has a signal processing capability. In an implementation process, each step in the above-mentioned method embodiments may be completed by an integrated logic circuit of hardware in a processor or an instruction in a form of software. The above-mentioned processor may be a general-purpose processor, a Digital Signal Processor (DSP), an Application Specific Integrated Circuit (ASIC), a Field Programmable Gate Array (FPGA) or other programmable logic devices, discrete gate, transistor logic devices, or discrete hardware components. The various methods, steps and logic block diagrams disclosed in the embodiments of the disclosure can be realized or executed. The general-purpose processor may be a microprocessor, or any conventional processors. The steps of the methods disclosed in the embodiments of the disclosure may be performed by a hardware in a decoding processor, or performed by a combination of hardware and software modules in the decoding processor. The software module may be located in a storage medium well applied in the field, such as Random Access Memory (RAM), flash memory, read-only memory, programmable read-only memory, electrically erasable programmable memory, or register. The storage medium is disposed in a memory. The processor reads information in the memory and completes the steps of the above method in combination with its hardware.

It could be understood that the memory in the embodiments of the disclosure may be a volatile memory or a nonvolatile memory or may include both volatile and non-volatile memories. The non-volatile memory may be Read Only Memory (ROM), Programmable ROM (PROM), Erasable PROM (EPROM), Electrically EPROM (EEPROM) or flash memory. The volatile memory may be a RAM. It should be noted that the memory of the systems and methods described herein is intended to include but is not limited to these and any other suitable types of memory.

Those skilled in the art could understand that the units and algorithm steps of the examples described in the embodiments disclosed herein can be implemented by electronic hardware, or a combination of computer software and electronic hardware. Whether these functions are executed by hardware or software depends on specific application and design constraints of technical solutions. Those skilled in the art may use different methods to implement the described functions for each specific application, and such implementation should be regarded as within the scope of the disclosure.

Those skilled in the art could clearly understand that for convenience and brevity of description, a specific working process of the above-described systems, devices and units can refer to corresponding processes in the foregoing method embodiments and is not repeated here.

In the above embodiments of the present disclosure, it should be understood that the disclosed methods, devices and systems may be implemented in other ways. For example, the above device embodiments are merely illustrative, and for example, division of units is merely one logical division, and other divisions may be realized in practice, for example, a plurality of units or components may be combined or integrated into another system, or some features may be omitted, or not executed. Further, the shown or discussed mutual coupling or direct coupling or communication connection may be an indirect coupling or communication connection via some interfaces, devices or units, and may be in electrical, mechanical or other forms.

The units described as separate parts may or may not be physically separate, and parts shown as units may or may not be physical units, that is, may be disposed in one place, or may be distributed on a plurality of network units. Some or all of the units can be selected according to practical requirements to achieve the purpose of the solutions of the embodiments.

In addition, functional units in the embodiments of the present disclosure may be integrated in one processing unit, or each unit may be physically separate, or two or more units may be integrated in one unit.

If the functions are realized in the form of software function units and sold or used as independent products, they can be stored in a computer-readable storage medium. Based on such understanding, the technical solutions in the disclosure or a part that contributes to the prior art or a part of the technical solutions can be embodied in the form of a software product. The computer software product is stored in a storage medium including several instructions to make a computer device (which may be a personal computer, a server, or a network device, etc.) execute all or a part of the steps of the methods described in the various embodiments of the disclosure. The above-mentioned storage medium includes U disk, mobile hard disk, ROM, RAM, magnetic disk or optical disk, and other media capable of storing program codes.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure. Therefore, the scope of the present disclosure should be based on the scope of claims. While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present invention. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

Systems and methods describing the present invention have been described. It will be understood that the descriptions of some embodiments of the present invention do not limit the various alternative, modified, and equivalent embodiments which may be include within the spirit and scope of the present invention as defined by the appended claims. Furthermore, in the detailed description above, numerous specific details are set forth to provide an understanding of various embodiments of the present invention. However, some embodiments of the present invention may be practiced without these specific details. In other instances, well known methods, procedures, and components have not been described in detail so as not to unnecessarily obscure aspects of the present embodiments.

The invention claimed is:

1. A multi-frame image fusion method, comprising:

performing an image alignment based on a frame with highest exposure sharpness among a plurality of frames of images, wherein the image alignment comprises extracting feature points of each of the plurality of frames of images, to make the plurality of frames of images have a common spatial layout;

calculating a fusion region of each frame of image based on local light source diffusion weight information in a spatial domain;

performing an image fusion on the plurality of frames of images with different exposures based on the fusion region, wherein the image fusion comprises fusing the plurality of frames of images with different exposures into a fused image using a preset algorithm; compressing the fused image to a preset dynamic range section;

wherein following performing the image alignment based on the frame with highest exposure sharpness among the plurality of frames of images, the method further comprises:

detecting a moving object among the plurality of frames of images with different exposures after the image alignment;

mapping the plurality of frames of images with different exposures to a same brightness section; and calculating differences between different frames of images to find an interference region in each of the plurality of frames of images.

2. The method according to claim 1, wherein calculating the fusion region of each frame of image based on local light source diffusion weight information in the spatial domain comprises:

calculating a fusion weight of each frame of image based on brightness and assigning the fusion weight of the frame of image with a higher exposure in a light source region to the frame of image with a lower exposure.

3. The method according to claim 1, wherein performing the image fusion on the plurality of frames of images with different exposures based on the fusion region comprises: performing the image fusion on the plurality of frames of images with different exposures using a method based on Laplacian pyramid fusion.

4. The method according to claim 1, wherein following performing the image fusion on the plurality of frames of images with different exposures based on the fusion region, the method further comprises:

detecting whether there is a portrait and/or a region where the portrait is located, and protecting the portrait to keep brightness of the portrait within a range based on the portrait and/or the region where the portrait is located.

5. The method according to claim 4, wherein detecting whether there is a portrait and/or a region where the portrait is located, and protecting the portrait to keep brightness of the portrait within the range based on the portrait and/or the region where the portrait is located comprises:

detecting the portrait and/or the region where the portrait is located by using artificial intelligence face detection and calculating a gamma mapping curve based on a brightness variation of the portrait, to keep the brightness of the portrait within the range after the image fusion.

6. The method according to claim 1, wherein following compressing the fused image to the preset dynamic range section, the method further comprises:

applying an image enhancement method to make local brightness of different regions in each of the plurality of frames of images with different exposures close to each other.

7. A multi-frame image fusion system, comprising:

an acquiring circuitry configured to perform image alignment based on a frame with highest exposure sharpness among a plurality of frames of images, wherein the image alignment comprises extracting feature points of each of the plurality of frames of images, to make the plurality of frames of images have a common spatial layout;

a calculating circuitry configured to calculate a fusion region of each frame of an image based on local light source diffusion weight information in a spatial domain;

a fusing circuitry configured to perform an image fusion on the plurality of frames of images with different exposures based on the fusion region, wherein the image fusion comprises fusing the plurality of frames of images with different exposures into a fused image using a preset algorithm; and a mapping circuitry configured to compress the fused image to a preset dynamic range section;

wherein the multi-frame image fusion system is configured to:

(a) detect a moving object among the plurality of frames of images with different exposures after the image alignment;

(b) map the plurality of frames of images with different exposures to a same brightness section; and (c) calculate differences between different frames of images to find an interference region in each of the plurality of frames of images, wherein (a)-(c) are performed following the image alignment based on the frame with highest exposure sharpness among the plurality of frames of images.

8. An electronic device, comprising a memory, a processor, and a computer program stored in the memory and operable on the processor, wherein when the processor executes a program to perform a multi-frame image fusion method, the method comprises:

performing an image alignment based on a frame with highest exposure sharpness among a plurality of frames of images, wherein the image alignment comprises extracting feature points of each of the plurality of frames of images, to make the plurality of frames of images have a common spatial layout;

calculating a fusion region of each frame of image based on local light source diffusion weight information in a spatial domain;

performing an image fusion on the plurality of frames of images with different exposures based on the fusion region, wherein the image fusion comprises fusing the plurality of frames of images with different exposures into a fused image using a preset algorithm; compressing the fused image to a preset dynamic range section;

wherein following performing the image alignment based on the frame with highest exposure sharpness among the plurality of frames of images, the method further comprises:

detecting a moving object among the plurality of frames of images with different exposures after the image alignment;

mapping the plurality of frames of images with different exposures to a same brightness section; and calculating differences between different frames of images to find an interference region in each of the plurality of frames of images.

9. A non-transitory computer-readable storage medium having computer instructions stored therein, wherein the computer instructions are configured to cause a computer to execute a multi-frame image fusion method, the method comprises:

performing an image alignment based on a frame with highest exposure sharpness among a plurality of frames of images, wherein the image alignment comprises extracting feature points of each of the plurality of frames of images, to make the plurality of frames of images have a common spatial layout;

calculating a fusion region of each frame of image based on local light source diffusion weight information in a spatial domain;

performing an image fusion on the plurality of frames of images with different exposures based on the fusion region, wherein the image fusion comprises fusing the plurality of frames of images with different exposures into a fused image using a preset algorithm;

compressing the fused image to a preset dynamic range section;

wherein following performing the image alignment based on the frame with highest exposure sharpness among the plurality of frames of images, the method further comprises:

detecting a moving object among the plurality of frames of images with different exposures after the image alignment;

mapping the plurality of frames of images with different exposures to a same brightness section; and calculating differences between different frames of images to find an interference region in each of the plurality of frames of images.

* * * * *